US009620025B2

(12) United States Patent
Shams et al.

(10) Patent No.: US 9,620,025 B2
(45) Date of Patent: Apr. 11, 2017

(54) WAKE VORTEX AVOIDANCE SYSTEM AND METHOD

(71) Applicant: The United States of America as represented by the Administrator of the National Aeronautics and Space Administration, Washington, DC (US)

(72) Inventors: Qamar A. Shams, Yorktown, VA (US); Allan J. Zuckerwar, Williamsburg, VA (US); Howard K. Knight, Hampton, VA (US)

(73) Assignee: The United States of America as Represented by the Administrator of the National Aeronautics and Space Administration., Washington, DC (US)

( * ) Notice: Subject to any disclaimer, the term of this patent is extended or adjusted under 35 U.S.C. 154(b) by 173 days.

(21) Appl. No.: 14/689,385

(22) Filed: Apr. 17, 2015

(65) Prior Publication Data

US 2015/0316575 A1 Nov. 5, 2015

Related U.S. Application Data

(60) Provisional application No. 61/987,088, filed on May 1, 2014.

(51) Int. Cl.

| | |
|---|---|
| ***G01P 5/24*** | (2006.01) |
| ***G08G 5/00*** | (2006.01) |
| ***B64F 1/36*** | (2017.01) |
| *G08G 5/02* | (2006.01) |
| *G08G 5/06* | (2006.01) |

(52) U.S. Cl.

CPC ............. *G08G 5/0091* (2013.01); *B64F 1/36* (2013.01); *G08G 5/0013* (2013.01); *G08G 5/0021* (2013.01); *G08G 5/0026* (2013.01); *G08G 5/0065* (2013.01); *G08G 5/025* (2013.01); *G08G 5/065* (2013.01)

(58) Field of Classification Search

CPC ...... B64F 1/36; G08G 5/0013; G08G 5/0021; G08G 5/0026; G08G 5/0065; G08G 5/0091; G08G 5/025; G08G 5/065; G01P 5/36

See application file for complete search history.

(56) References Cited

U.S. PATENT DOCUMENTS

| | | | | |
|---|---|---|---|---|
| 3,550,720 | A | 12/1970 | Ballard | |
| 7,394,723 | B2 | 7/2008 | Rubin | |
| 8,401,217 | B2 | 3/2013 | Shams et al. | |
| 8,671,763 | B2 | 3/2014 | Zuckerwar et al. | |
| 8,781,137 | B1 * | 7/2014 | Goodwin ............... | H04R 3/005 381/94.1 |
| 2002/0121576 | A1 * | 9/2002 | Corjon .................... | B64C 23/06 244/199.1 |

(Continued)

OTHER PUBLICATIONS

Richard Raspet et al., "Instrumentation for Infrasonic Wind Noise Studies," 154th ASA Meeting, Nov. 28, 2006, New Orleans, LA.

*Primary Examiner* — Francis Gray
(74) *Attorney, Agent, or Firm* — Andrea Z. Warmbier

(57) ABSTRACT

A wake vortex avoidance system includes a microphone array configured to detect low frequency sounds. A signal processor determines a geometric mean coherence based on the detected low frequency sounds. A display displays wake vortices based on the determined geometric mean coherence.

20 Claims, 8 Drawing Sheets

(56) References Cited

U.S. PATENT DOCUMENTS

| | | | | |
|---|---|---|---|---|
| 2005/0103944 | A1* | 5/2005 | Greenblatt | B64C 23/04<br>244/200.1 |
| 2009/0107232 | A1* | 4/2009 | Martin | G01S 15/003<br>73/170.13 |
| 2011/0210202 | A1* | 9/2011 | Schroder | B64F 1/36<br>244/114 R |

* cited by examiner

400

500

900

WAKE VORTEX AVOIDANCE SYSTEM AND METHOD

CROSS-REFERENCE TO RELATED APPLICATION

This application claims the benefit of U.S. Provisional Application Ser. No. 61/987,088, filed on May 1, 2014, the disclosure of which is incorporated by reference herein in its entirety.

STATEMENT REGARDING FEDERALLY SPONSORED RESEARCH OR DEVELOPMENT

The invention described herein was made in part by employees of the United States Government and may be manufactured and used by or for the Government of the United States of America for governmental purposes without the payment of any royalties thereon or therefore.

BACKGROUND OF THE INVENTION

The wake vortex hazard has emerged with the advent of aviation, especially with the introduction of jet airline service in the 1950's. When an aircraft encounters the wake shed from a leading aircraft, it experiences a roll, which may lead to a crash and fatalities. To avoid such encounters, the Federal Aviation Administration (FAA) has issued aircraft separation standards for takeoff, approach, and landing operations (FAA ORDER JO 7110.65U and 7110.478).

SUMMARY OF THE INVENTION

An all-weather operational wake vortex avoidance system is configured for measuring low-frequency emissions from aircraft wake vortices during take-off and landing. The system may include low-power infrasonic microphones powered by 12V battery, all-weather windscreens, installed at strategic locations within and perhaps beyond an airport, and signal processing software. Each microphone is disposed in the windscreen chamber and is configured for detecting low-frequency sound. The signal processing methodology is based upon the geometric mean coherence among microphone pairs, which can be more reliable than spectral amplitudes for wake vortex detection.

DETAILED DESCRIPTION OF THE INVENTION

While the aircraft separation standards have proved successful, they result in costly air traffic density at airports. The systems and methods described herein may be used to advise air traffic controllers and pilots of the status of lingering wake vortices on an airport runway, to safely reduce aircraft separation. The wake avoidance systems and methods can comply with various airport field instrumentation constraints. For example, the systems and methods may (1) conform to airport safety constraints (e.g. no obstacles near the runway or flight path); (2) have field calibration capability; (3) have all-weather service capability; (4) have site proximity to avoid intervening effects as may be experienced by remote sensors; (5) have fail-safe operation; (6) provide service for takeoff, approach, and landing; and/or (7) have real-time display.

Figure 1:
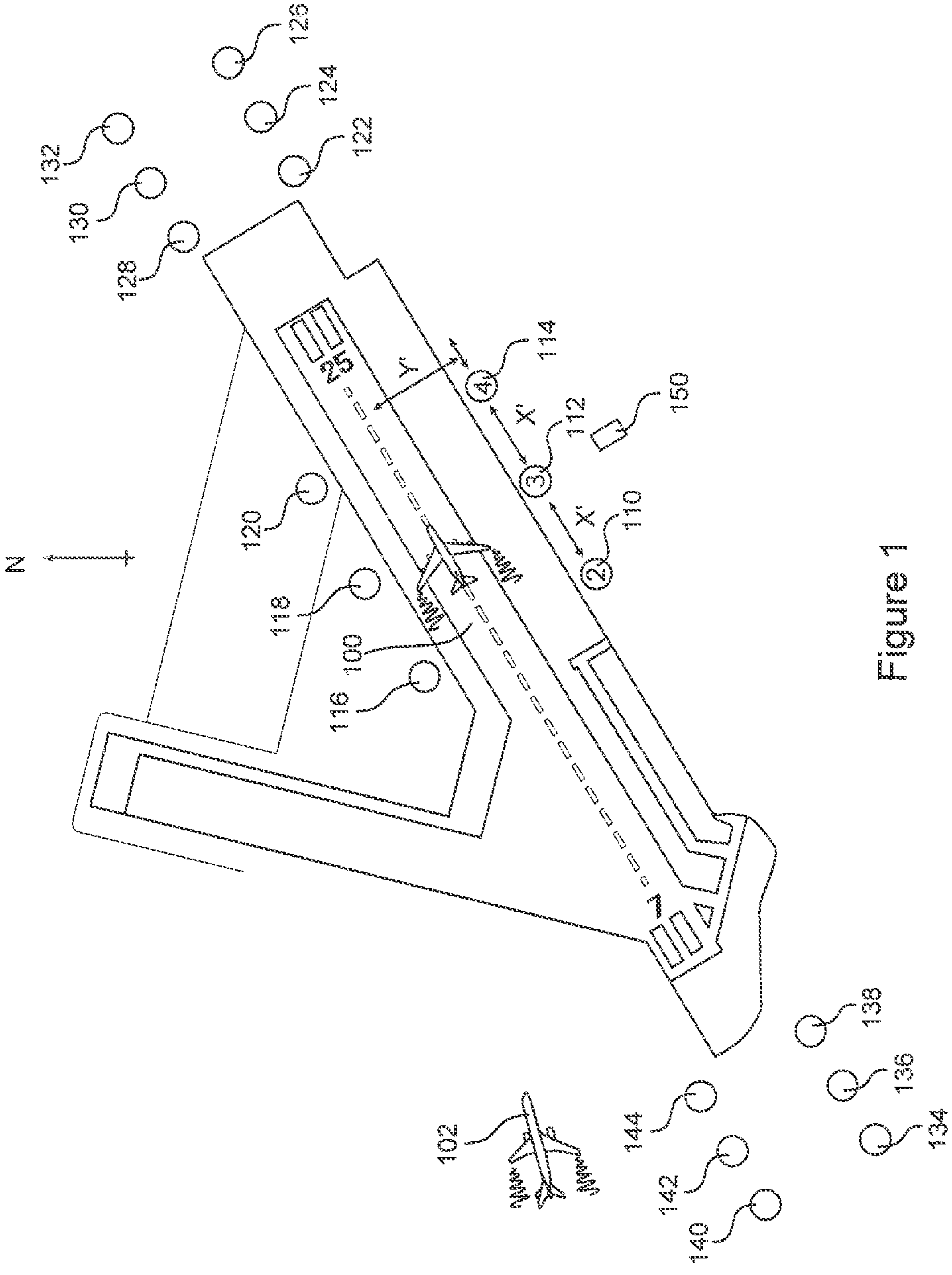
FIG. 1 is a diagram of an example airport runway.

FIG. 1 is a diagram of an example airport runway 100 including a wake vortices detection and monitoring system (herein referred to as wake vortex avoidance system). In one embodiment, the systems and methods of the wake vortex avoidance system monitor the life span of wake vortices shed from aircraft 102 by detecting the vortices low-frequency emissions. The wake vortex avoidance system may include a plurality of detection stations 110, 112, and 114 installed at an airport, and each detection station 110, 112, and 114 includes a microphone 30 for detecting infrasounds. The detection stations 110, 112, and 114 may be arranged in an array, e.g., in a linear layout to run parallel to a runway 100 to provide a microphone array. The detection stations 110, 112, and 114 can be spaced about X feet apart, e.g., about 30-300 feet apart, or more particularly about 200 feet apart. The stations can also be space about Y feet from the centerline of the runway 100, e.g., 200-300 feet, or more particularly about 250 feet from the centerline of the runway 100, for example as required by regulations. The spacing between system detection stations 110, 112, and 114 exceeds the outer scale of turbulence of the inertial subrange, typically about 30 feet or less, lest pressure fluctuations due to local turbulence appear as coherent signals between station pairs.

Additionally or alternatively, detection stations 116, 118, 120 may be arranged in a linear layout on the other side of the runway 100. If both sides of the runway 100 include detection stations, vortices created by the tips of both wings of the aircraft 102 may be individually detected as the aircraft 102 move along the runway 100 during takeoff, approach and landing. Additionally or alternatively, detection stations 122, 124, 126, 128, 130, and 132 and detection stations 134, 136, 138, 140, 142, 144 may be arranged at the ends of the runway 100 to detect vortices as the aircraft 102 are approaching the runway 100 during approach and landing, or leaving the runway 100 during takeoff. The detection stations 122, 124, 126, 128, 130, and 132 and detection stations 134, 136, 138, 140, 142, 144 may be spaced apart as described above, and may be located up to a mile or more away from the ends of the runway 100. Other amounts and arrangements of detection stations may be used.

Power and signals from any or all of the detection stations 110, 112, 114, 116, 118, 120, 122, 124, 126, 128, 130, 132, 134, 136, 138, 140, 142, and 144, may be transmitted to one or more data acquisition stations 150 (DAS) by way of cables and/or wirelessly. Hereinafter, the detection stations 110, 112, 114, 116, 118, 120, 122, 124, 126, 128, 130, 132, 134, 136, 138, 140, 142, and 144 are referred to as detection stations 110, 112, and 114, or station 2, 3, 4, for the sake of simplicity of explanation, but the systems and methods apply to any of the detection stations 110, 112, 114, 116, 118, 120, 122, 124, 126, 128, 130, 132, 134, 136, 138, 140, 142, and 144. The data acquisition stations 150 can include a processor and memory to process the received signals, for example as described in more detail below. The processor may be implemented with hardware, firmware and/or software, or a combination of hardware, firmware and/or software. The data acquisition stations 150 may be located locally to or remotely from to the runways 100. The data and coherence time history spectrogram of aircraft may be transferred to control tower and to pilots in near real time.

Figure 2:
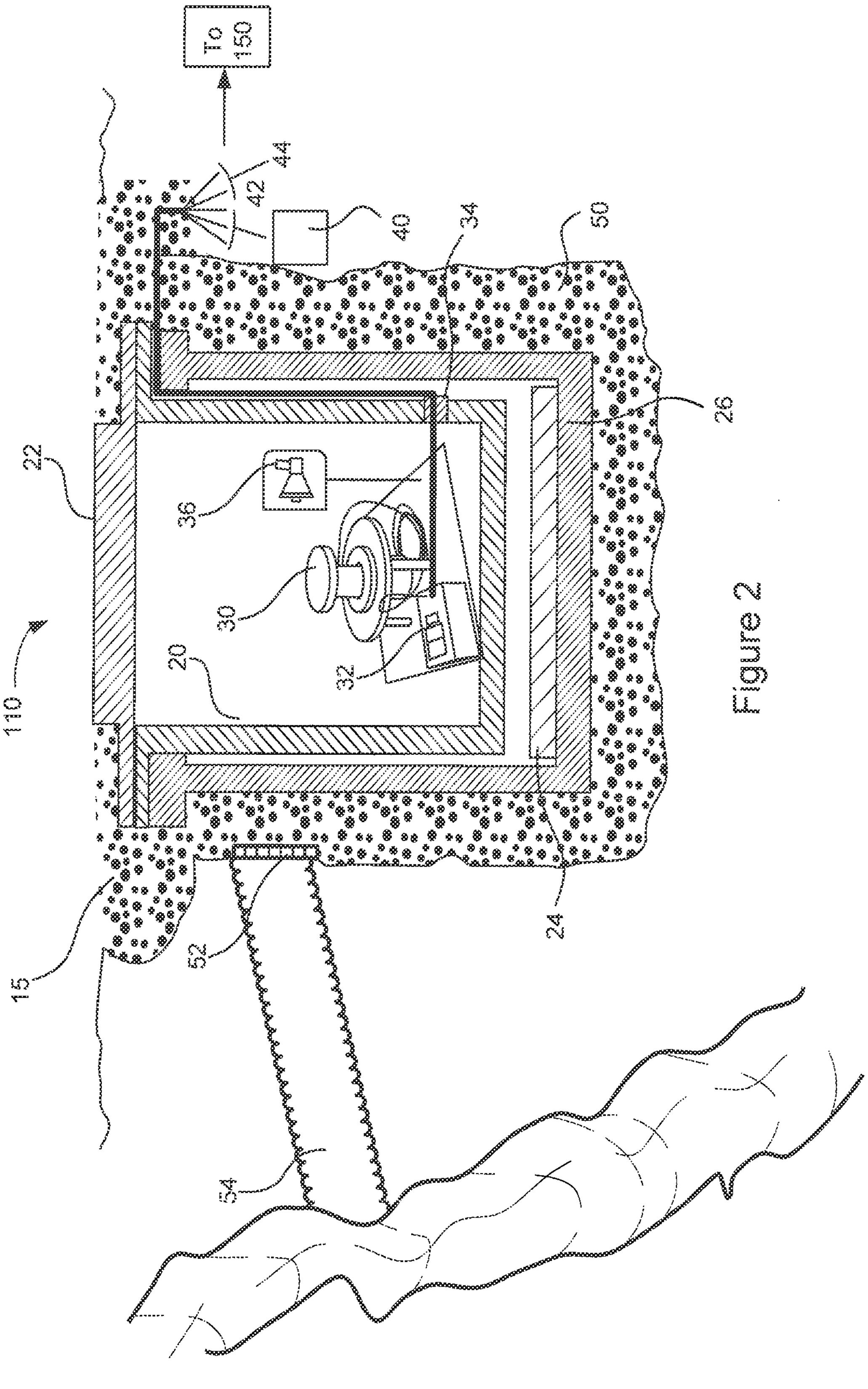
FIG. 2 is a diagram of an exemplary detection station.

FIG. 2 is a diagram of an exemplary detection station 110. The low-frequency emissions, e.g., infra-sounds, from the wake vortices shed from an aircraft 102 on or around the runway 100 are detected by a low-frequency microphone 30. The low-frequency microphone 30 may be used as part of a phases and/or infrasonic microphone array (e.g. U.S. Pat. No. 7,394,723 B2 and U.S. Pat. No. 3,550,720, which are incorporated by reference in their entireties). The infrasonic microphone array is weather proof unlike some other wake vortex detection technologies, e.g., (1) pulsed LIDAR, (2) continuous LIDAR, (3) sonic detection and ranging (SODAR), (4) continuous-wave radar, (5) opto-acoustic sensing, and (6) ground based anemometers.

An example of a low-frequency microphone is described in commonly assigned U.S. patent application Ser. No. 13/771,735, which is incorporated by reference in its entirety. U.S. patent application Ser. No. 13/771,735 was filed on Feb. 20, 2013, and claims priority to and is a divisional of U.S. patent application Ser. No. 11/780,500, filed on Jul. 20, 2007, now U.S. Pat. No. 8,401,217, which is also incorporated in their entirety herewith. Low frequency signals propagating through the atmosphere are severely contaminated by low-frequency natural pressure fluctuations. The convected (non-propagating) pressure fluctuations are prevented from reaching the microphone 30 by means of a windscreen assembly, including a closed-cell polyurethane box 20, removable box lid 22, reflector plate 24, and exterior protective case 26. Other waterproof materials may be used for the box 20 and 26. An example of a windscreen assembly is described in U.S. Pat. No. 8,671,763, which is incorporated by reference in its entirety. The box 20 and lid 22 are of sufficiently low acoustic impedance to permit transmission of propagating sounds, as emitted from aircraft wakes, while rejecting the contaminating pressure fluctuations. The windscreen assembly is mounted flush with the ground surface 15 so that horizontal wind and associated turbulence nearly vanish at the ground surface.

The low-frequency microphone 30 and signal conditioner 32 (or preamplifier) need not be limited to that described in U.S. patent application Ser. No. 13/771,735. In one embodiment, operating power is provided by a battery 40. The power specification on the microphone signal conditioner 32 permits operation for long periods of time between charges, which may be provided by a portable generator or by line power if available. The microphone 30 can meet a specification of requiring no more than about 50 mW of power. Cabling 42 from the microphone signal conditioner 32 runs to the battery 40 (power) and cabling 44 provides data to be sent to data acquisition system 150 (signal). The cabling 42 and cabling 44 may enter the box 20 via an opening 34. The cabling 44 for the data can include phone lines, coax cable, and/or Ethernet cable, etc. Additionally or alternatively, the data may be sent to the data acquisition system 150 wirelessly, for example, via Wi-Fi, cellular, and/or satellite, etc.

Long-term service of the wake vortex avoidance system may include monitoring of the health of the system. Two examples of service include calibration and characterization. The removable lid 22 (an example of which is described in U.S. patent application Ser. No. 13/771,735 which is incorporated by reference in its entirety herein) permits access to the microphone 30 for calibration by a recognized method, e.g. a pistonphone, which is referenceable to a standard. This procedure may be done on a periodic (e.g. monthly) basis to ensure measurement accuracy and calibration of the microphone 30. Characterization is performed by exciting the diaphragm of the microphone by the internal acoustic source 36. The known signal generated by the acoustic source 36, e.g. continuous tone, is processed by the data acquisition system 150 to recognize the possible occurrence of marked irregularities to determine a health of the microphone 30.

The protective case 26 protects the box 20 from deterioration from rain, ice, and whatever corrosive matter may be inherent in the ground. The drainage rock 50, drainage cap 52, and flexible drainage pipe 54 remove rain water from the vicinity of the windscreen assembly (e.g., closed-cell polyurethane box 20, removable box lid 22, and exterior protective case 26) and render the vortex avoidance system an all-weather system. Rain drops impinging upon the removable box lid 22 produce incoherent sounds above the infrasonic range of frequencies and do not interfere with its normal operation. Likewise, wind is not a factor. The microphone 30 is secure, protected from the elements, and operates over a wide range of temperature. The reflector plate 24 is weighted so that the windscreen assembly does not lift by floating when there is water surrounding it. Airport operations require good drainage from the runways and have drainage ditches 56 available as rain water reservoirs.

Figure 3:
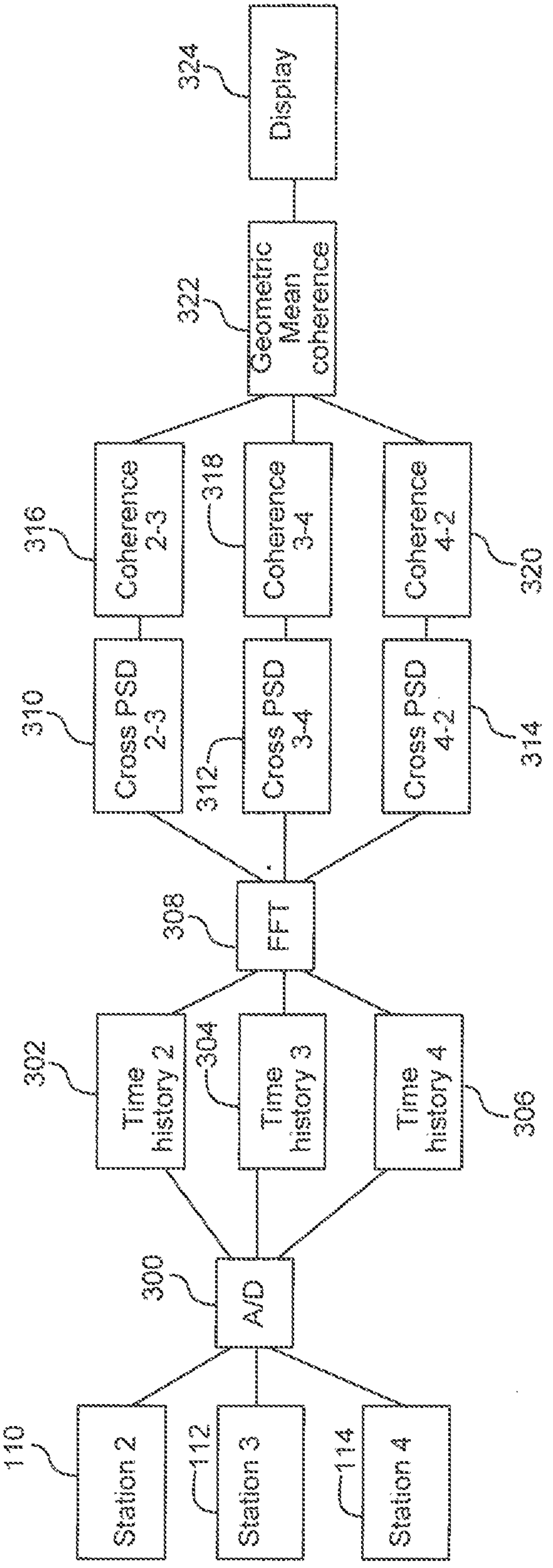
FIG. 3 is a block diagram of an example processing of data received from the detecting stations.
Figure 4:
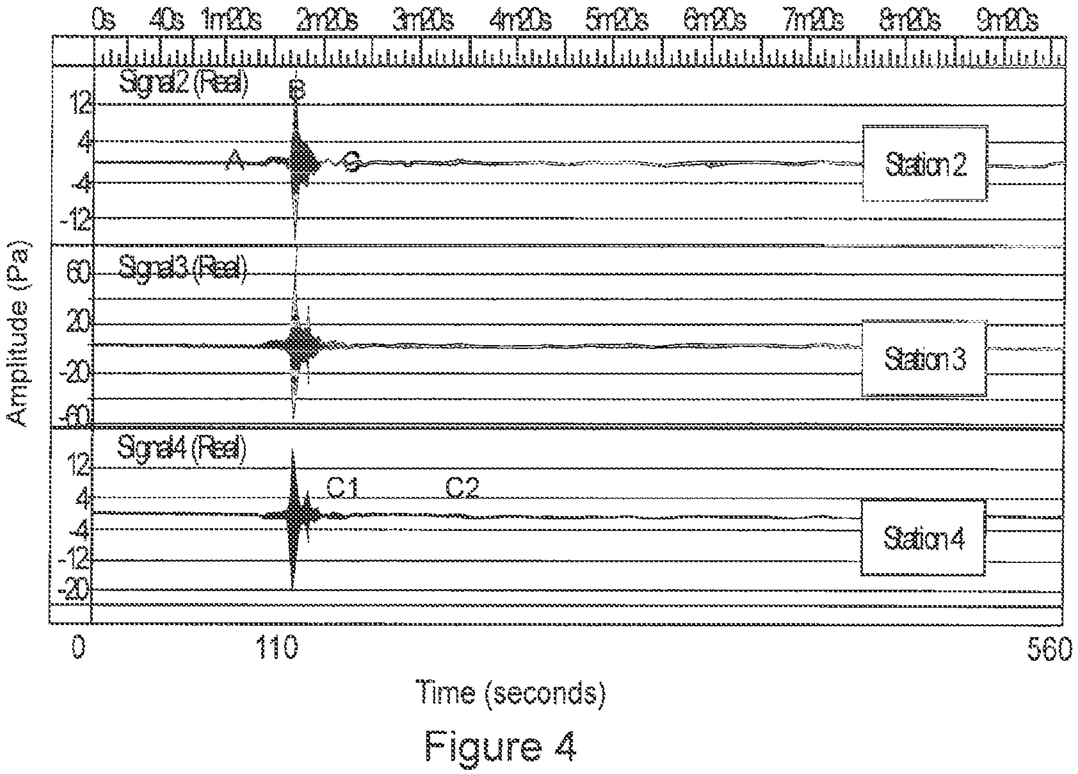
FIG. 4 is a diagram of an example time history divided into regions A, B, and C for stations 2, 3 and 4.

FIG. 3 is a block diagram of an example processing of data received from the detecting stations 110 (station 2), 112 (station 3), and 114 (station 4). The low-frequency signals detected by the microphones 30 in stations 2, 3, and 4 are sent to the data acquisition system 150. The data acquisition system 150 may be any system that performs the signal processing described herein. In one embodiment, the data acquisition system 150 hardware is the PULSE system manufactured by Bruel & Kjaer. The signals receive from wirelessly and/or from cabling 44 are converted to digital form by the analog-to-digital (A/D) converter 300, which yields the digitized versions of time histories 2, 3, and 4. The data are processed in determined blocks, for example 10-second blocks. Other time periods may be used. The blocks are used to identify takeoff, approach and landing times of aircraft 102. One embodiment of a time history 302, 304, 306 of an aircraft 102 during takeoff, as recorded on stations 2, 3, and 4 respectively, is in FIG. 4. Since the example total block size is 540 seconds, FIG. 4 represents 54 blocks of data. However, the total block size can vary between about 300 seconds to about 600 seconds, or other time periods.

FIG. 4 is a diagram of an example time history 400 divided into regions A, B, and C for stations 2, 3 and 4. Region A represents the time before takeoff. The time between acceleration and takeoff varies depending on multiple factors, including the size of the aircraft 102, power of the aircraft 102, etc. In FIG. 4, the aircraft 102 starts idling and then accelerating between about 80-90 seconds. At about 110 seconds, the aircraft 102 enters the microphone region of stations 2, 3 and 4, and then takes off at about 110-120 seconds. In this region, wake vortices shed from the aircraft 102 are beginning to develop.

Region B reveals a pressure burst due to hydrostatic pressure generated by the aircraft 102 as it passes the microphones and very nearly represents the time of takeoff. At takeoff speeds, typically 160-180 nautical miles per hour, the aircraft 102 passes the microphones of all three stations 2, 3 and 4 within two seconds, as revealed by the sequence of bursts. The data acquisition stations 150 may note a time of the pressure bursts to serve as a time stamp to reference the time of takeoff and to associate the wake vortices with the time of the pressure burst. The time stamp permits discrimination of subsequent vortices on the same runway 100 and vortices on adjacent runways. The strong vortices typically appear on the runway 100 after burst.

In Region C the aircraft 102 is airborne, leaving a trail of wake vortices on or near the runway.

The pressure burst in Region B is so large that it overwhelms the low-frequency emissions from the shed vortices. However, in Regions A and C, in the absence of the burst, the low-frequency emissions can be detectable for time spans as long as 2-3 minutes. In Region A where the aircraft 102 is accelerating but still on the ground, wake vortices start to build, but are not yet that strong. In Region C1, the vortex avoidance system has detected strong vortices and their strength depends on the size of the aircraft 102, with heavier aircraft 102 having stronger and longer vortices than lighter aircraft 102. In region C2 the vertices are dissipating or gone.

Referring again to FIG. 3, the time histories are transformed to the frequency domain by means of the Fast Fourier Transform (FFT) operation 308, which yields the power spectral density (PSD) function.

Figure 5:
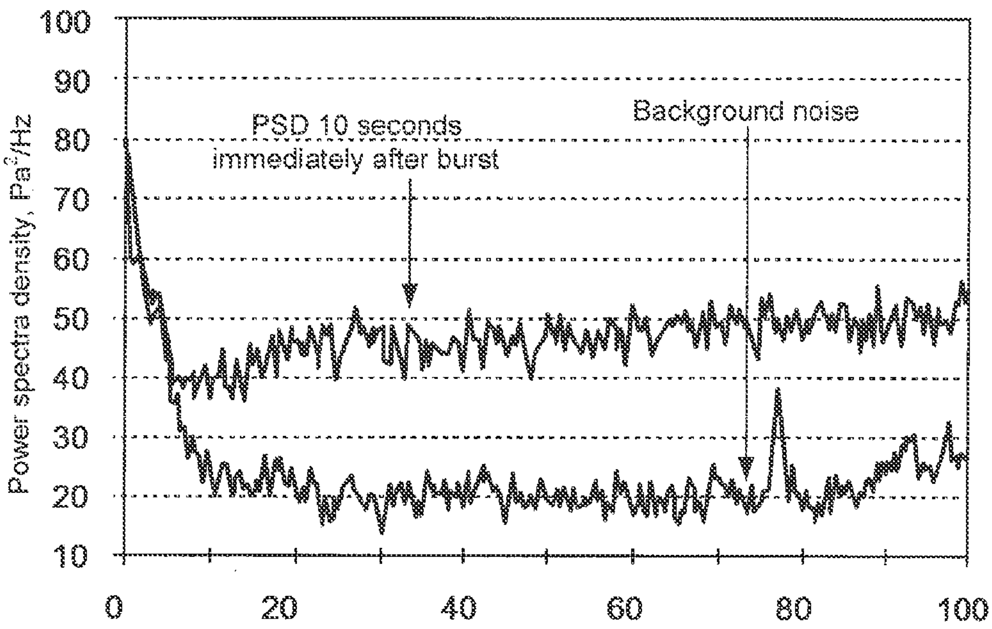
FIG. 5 is a diagram of an example power spectral density (PSD) of emissions from the wake vortex.

FIG. 5 is a diagram of an example power spectral density (PSD) graph 500 of emissions from the wake vortex. An example PSD of emissions from a wake vortex is shown, evaluated over the 10-second block immediately following the pressure burst. The power spectral density is broadband over the frequency interval of about 10-100 Hz. Also shown is the background noise, e.g., the microphone output in the absence of wake vortex emissions. In this example, the wake vortex signal is about 30 dB above the background noise. However, as the wake vortex dissipates, its emissions fall until it merges into the background noise. Because the vortex signal and background noise are similar in spectral content, the amplitude of the wake vortex signal can be used but may not be an optimal criterion for determining the status of the vortex.

Referring again to FIG. 3, the cross power spectral density 310, 312, and 314 among microphone pairs (stations 2 and 3, stations 3 and 4, and stations 4 and 2) is computed from the FFT operation by the data acquisition station 150. From the Fourier transform of the cross power spectral density function, the coherence function 316, 318, 320 is computed among microphone pairs. Identical signals in a microphone pair will yield a coherence value of one (1); signals void of identical content, e.g. due to background noise, will yield a value of zero (0).

Figure 6A:
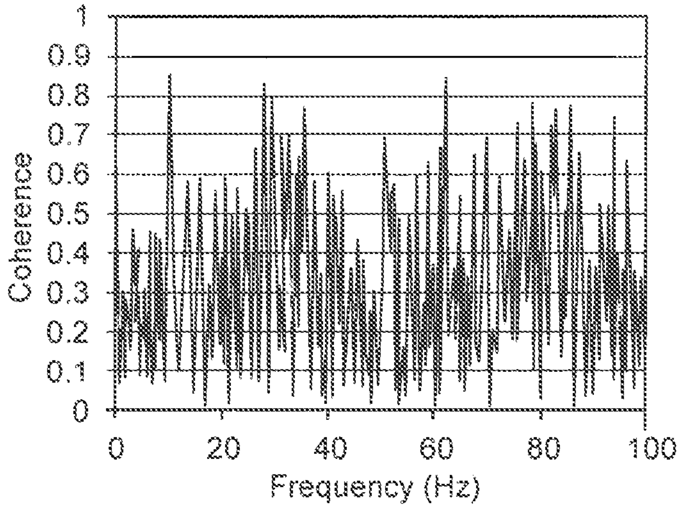
FIGS. 6A-6C show the geometric mean coherence spectrum between microphones 30 for stations 2, 3 and 4.
Figure 6B:
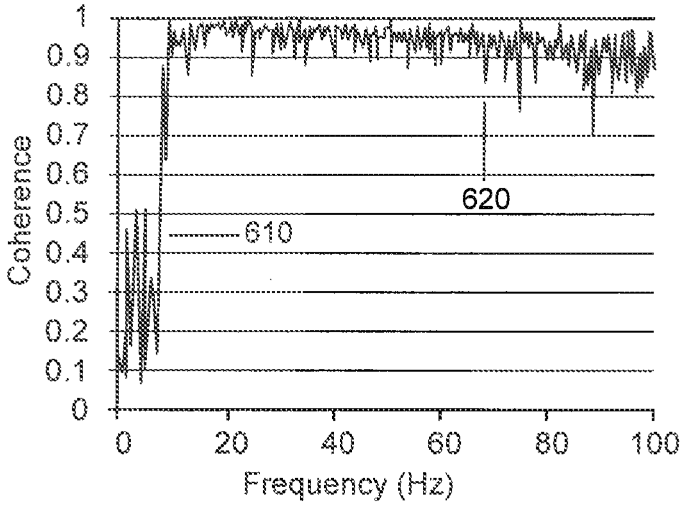
Figure 6C:
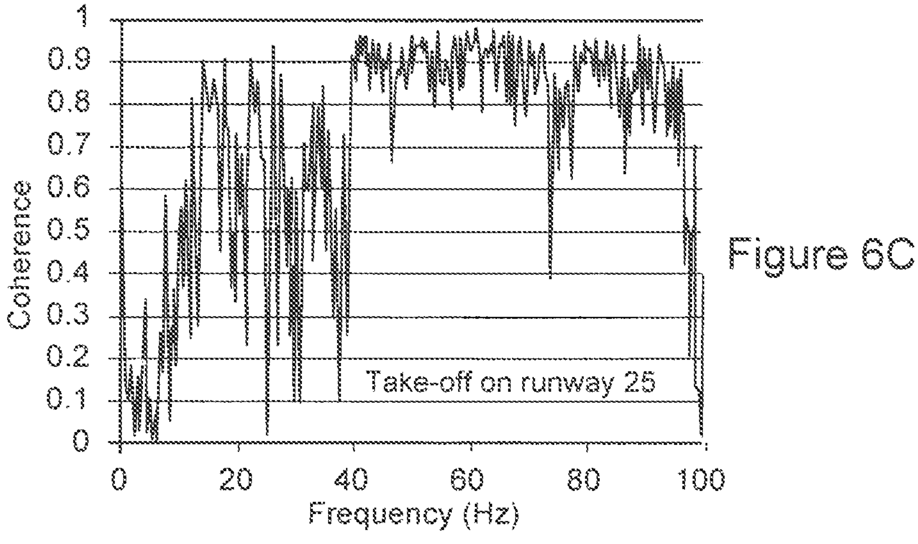

FIGS. 6A-6C show the geometric mean coherence spectrum between microphones 30 for stations 2, 3 and 4. The geometric mean coherence functions can serve as a criterion of the status of the wake vortices. The graphs in FIGS. 6A-6C show an example output for a Canadian Regional Jet (CRJ) type aircraft, manufactured by Bombardier. In FIG. 6A, the aircraft 102 is accelerating towards takeoff but is not yet airborne. The graph demonstrates that there is no coherence since the values are varying between zero and one. In FIG. 6B, the aircraft 102 has just become airborne, e.g., within 10 second of being airborne. High coherence, e.g. a coherence value of about one, begins at around 10 Hz (610). At around 70 Hz coherence begins to decline (620). Therefore, the coherence is near unity for a frequency from about 10 Hz to about 70 Hz, illustrating that microphones 30 for stations 2, 3 and 4 are receiving signals from the same source, e.g., wake vortex emissions above the background noise. The frequency band can vary for different aircraft types.

A CJR aircraft is lightweight so wake vortices generated do not remain at the runway 100 for a long time. In some examples, the vortices start dispersing after about 50 second. Since wake vortices for this type of light aircraft start at about 10 Hz and do not persist after about 70 Hz, the arithmetic mean of the geometric mean coherence as described in FIG. 7 can be determined for this band only. For heavier aircraft like a Boeing 747, frequency band can be between about 2 Hz to about 100 Hz, or higher. For the Boeing 747 the arithmetic mean of the geometric mean coherence can be determined for the frequency band between 2 Hz and 100 Hz, or higher. A desired frequency can be determined for each aircraft at an airport for calculating arithmetic mean based on the geometric mean coherence for that aircraft. Frequency bands for other types of aircraft, e.g., Boeing 737, Airbus 380, Boeing 787, etc., may differ. Wake vortices for the heavier aircraft, e.g., Airbus 380 and Boeing 787 may persist at and around the runway for more than 4 or 5 minutes.

FIG. 6C shows the coherence function about 50 seconds after the burst. The drop in the level of coherence is concomitant with vortex decay. As the wake vortex continues to decay, the level of coherence continues to drop. The aircraft 102 has been airborne for about 50 seconds and the vortices have started breaking up. This time history of vortex decaying can be displayed, e.g., to the air traffic controller and/or pilots, to make it easier to decide when the following aircraft can take off and land without being affected by the vortices. A level of coherence deemed to correspond to sufficient vortex decay to resume normal aircraft operations can be determined by regulation, e.g., based on the above geometric mean coherence graphs.

Figure 7:
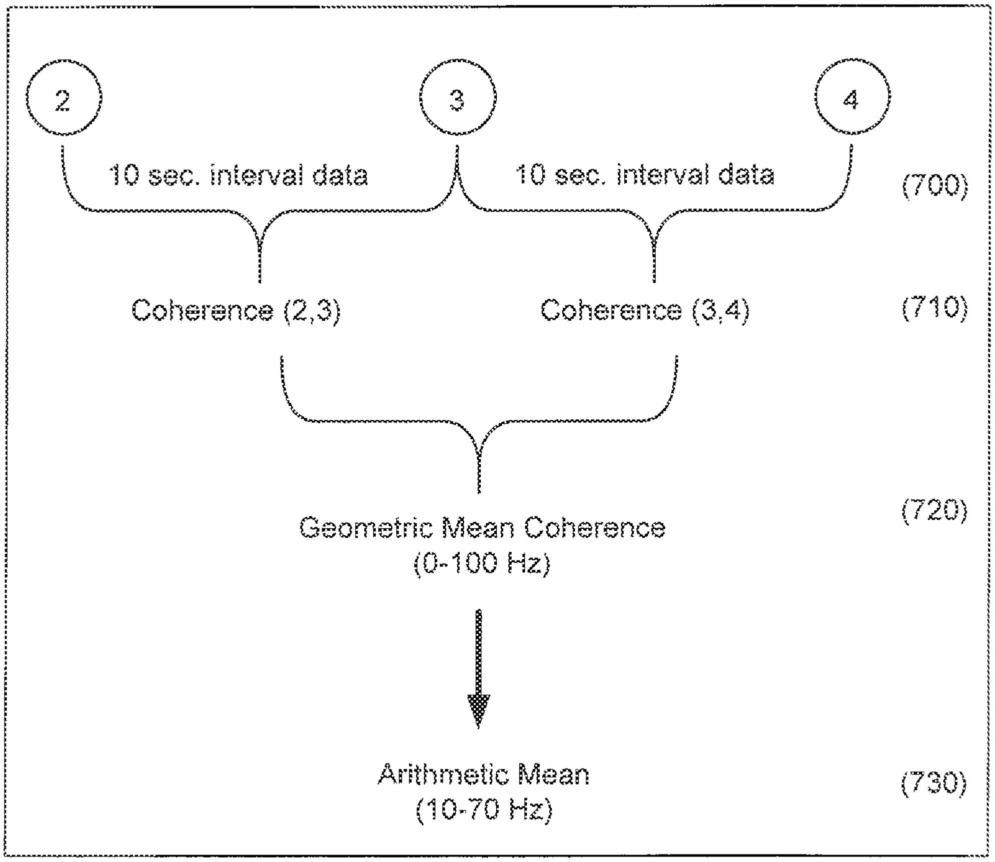
FIG. 7 is an exemplary flow diagram of determining geometric mean coherence and arithmetic mean from data collected at different microphone stations.

FIG. 7 is an exemplary flow diagram of determining geometric mean coherence and arithmetic mean from data collected at different microphone stations. Data received from the microphones 30 for stations 2, 3 and 4 is processed for an interval, e.g., about every ten seconds (700). Other time intervals can be used. The coherence for stations 2 and 3, and the coherence for stations 3 and 4, are determined (710), for example as described above. The geometric mean coherence for stations 2, 3 and 4 is determined for a determined frequency, e.g., 0-100 Hz (720). The frequency range can depend on at which frequencies the vertices are detected for the different types of aircraft.

| Coherence (2, 3) | Coherence (3, 4) | Mean Coherence | Geometric Mean Coherence |
|---|---|---|---|
| 0.5 | 0.3 | 0.4 | (0.5*0.3)^½ = 0.387 |
| 0.6 | 0.75 | 0.675 | (0.6*0.75)^½ = 0.671 |
| 0.35 | 0.25 | 0.6 | (0.35*0.25)^½ = 0.296 |

The geometric mean coherence is a more conservative value than the mean coherence. For example, if coherence of (2,3) is 0.9 and coherence of (3,4) is 0.1, then mean coherence is 0.5, which is higher than the geometric mean coherence which is (0.9*0.1)^½=0.3. The mean coherence may also be used but the conservativeness of the geometric mean coherence may be preferable. The arithmetic mean of each ten second interval is used to calculate the coherence time history over a determined frequency (730). The example arithmetic mean of the three points above is (0.387+0.671+0.296)=0.451. The determined frequency can vary by aircraft, e.g. 10-70 Hz for a CRJ aircraft as in FIG. 6B.

Figure 8:
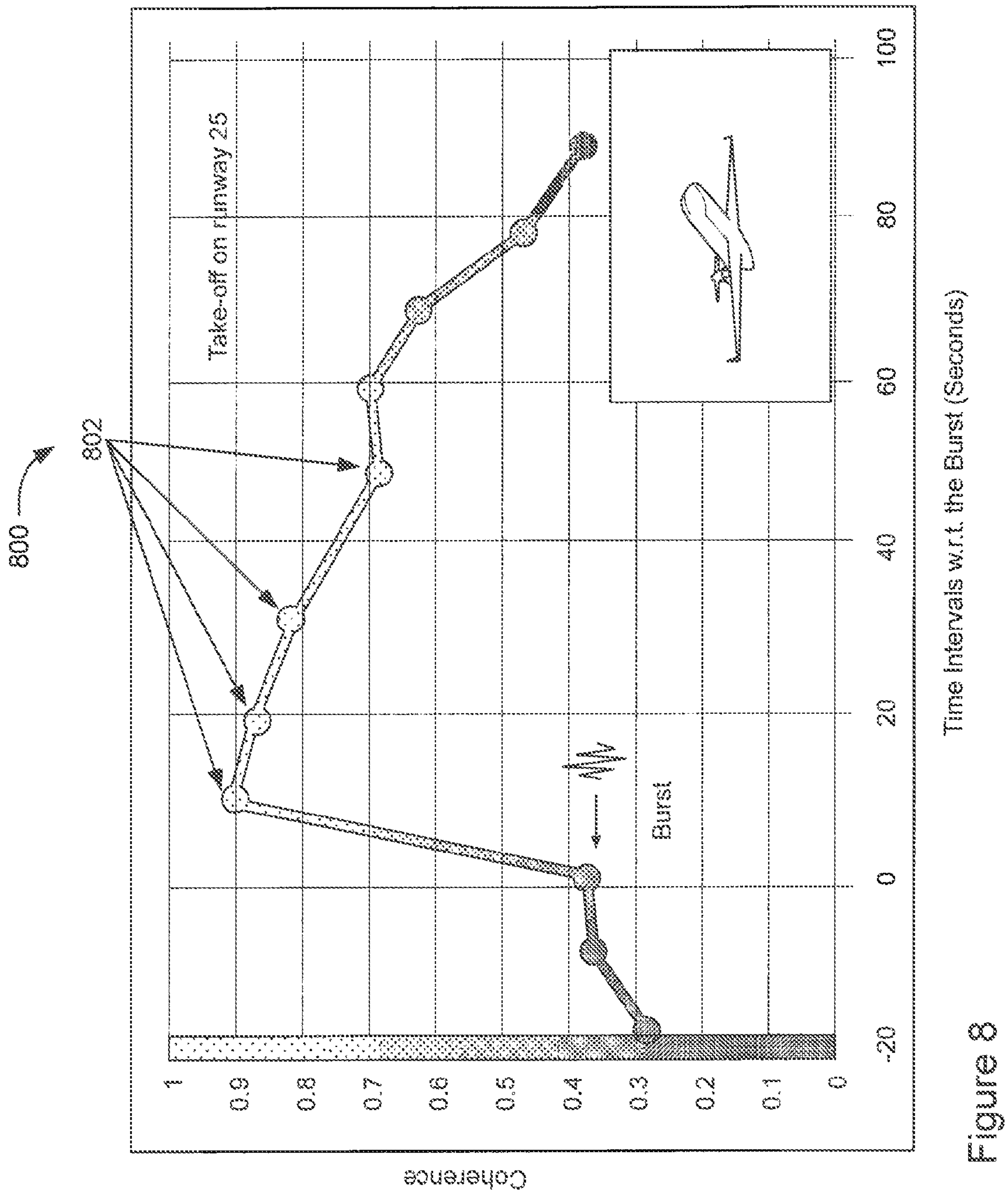
FIG. 8 is a time history graph of an arithmetic mean plot for an example geometric mean coherence among the three microphone pairs for stations 2, 3 and 4.

FIG. 8 is a time history graph 800 of an arithmetic mean plot for an example geometric mean coherence (322, FIG. 3) among the three microphone pairs for stations 2, 3 and 4. The graph, e.g., a spectrogram, can be plotted to monitor a lifespan of wake vortices shed form the aircraft 102. Initially, the aircraft 102 starts from rest at the end of the runway, where the coherence function is at its minimum. The aircraft 102 begins accelerating at about 20 seconds. As the aircraft 102 accelerates along the runway, the coherence function rises slightly, indicating the development of wake vortices even when the aircraft 102 is on the ground. At about 30-40 seconds, the aircraft 102 enters the microphone zone, the burst occurs and the aircraft 102 becomes airborne. The pressure bursts reaching the three microphones are uncorrelated, in which case the coherence is low. In the 10-second interval immediately following the burst, the aircraft 102 is airborne, the wake vortices are fully developed, and the coherence is high. At 802, the points reflect coherence time histories per aircraft type. The points are an exemplary arithmetic mean of geometric mean coherence during takeoff of CRJ aircraft. Time histories do vary per aircraft type. In the following 10-second intervals the coherence falls, indicating a decaying vortex on the runway. At a time shortly after about 120 seconds the coherence reaches its initial low level.

Figure 9:
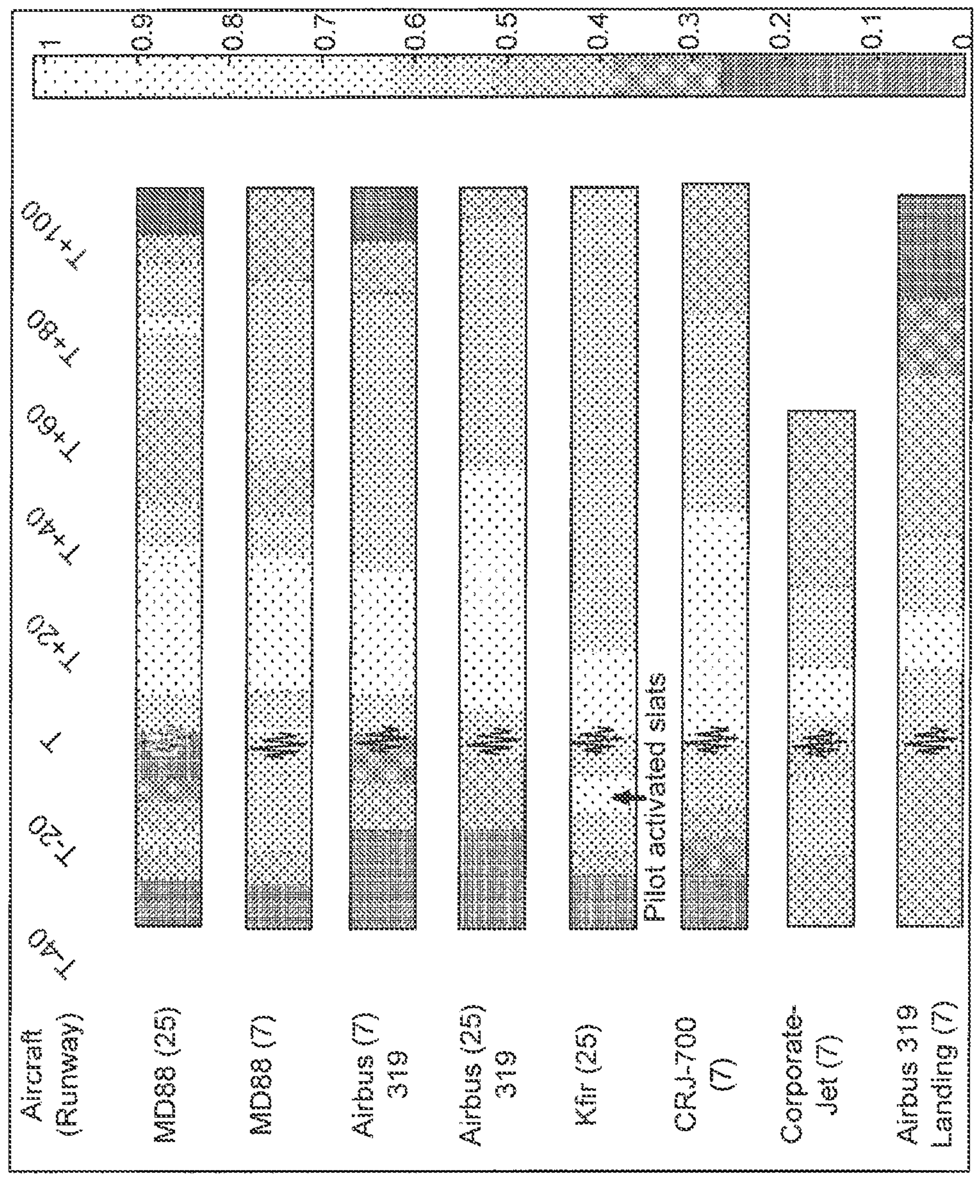
FIG. 9 is a diagram of an example coherence time history spectrogram of different aircraft.

FIG. 9 is a diagram of an example coherence spectrogram 800 for different aircraft 102. For purposes of the description, MD88 (25) means the McDonnell Douglas MD88 type aircraft taking off from runway 25 and MD88 (7) means the McDonnell Douglas MD88 type aircraft taking off from runway 7, etc. A time of the pressure burst and a length of the coherence vary from aircraft 102 to aircraft 102, e.g., depending on a size of the aircraft. Therefore, the times intervals between aircraft 102 to take off and land can vary. The coherence spectrogram 900, and/or geometric mean coherence of FIGS. 6 and 8, can be displayed to a user (324, FIG. 3), e.g., air traffic controller and/or pilot, etc., to help in determining safe time periods between take offs and landings of aircraft 102, and approach distances. The display may include a monitor and/or other displays, e.g., lights positioned along the runway and visible by a pilot of the aircraft 102. The lights can be colored coded, e.g., red for vertices existing by the runway 100, yellow for a low level of vertices and green for no vertices. More takeoffs and landings and closer approaches can occur by the air traffic controller and/or pilot, etc. using the vortex avoidance system, thereby saving the aircraft industry money.

Therefore, the system may include microphone 30 and supporting electronics (signal conditioner or preamplifier 32) that consume less than 50 mW power, thus permitting long durations between recharging of the battery. The windscreen material is preferably impervious to water, thus enabling all-weather operation. Other embodiments include flush mounting of the windscreens insures that they do not obstruct airport operations and are not be seen by pilots, and drainage rock around the windscreen and a drainage pipe ensure adequate flushing of rain water from the vicinity of the windscreen. The vortex avoidance system may also include the installation of an acoustic source within the windscreen enables continual, non-invasive monitoring of the health of the system. The system may also include detection of a pressure burst and its utilization as a time stamp to associate a signal with a vortex on a runway and permit discrimination of subsequent vortices on the same runway or vortices on adjacent runways. The system may also use the coherence function as a criterion for the status of a wake vortex on a runway. In yet another embodiment, the system may include a display of the mean coherence function versus time serves to reveal sufficient vortex decay to resume normal airport operations on a particular runway. This capability safely shortens the spacing between successive aircraft 102 on both takeoff and landing. The economic impact is anticipated to be massive. The system may also include a specification on minimum distance between microphone stations, typically about 30 feet, to ensure that background signals from local atmospheric turbulence are not common to the two stations and thus eliminates contribution from the coherence spectrum. In this embodiment, the microphone stations were spaced about 200 feet to exceed the outer scale of turbulence of the inertial sub-range, which is typically 30 feet or less.

While particular embodiments are illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiments illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims.

What is claimed is:

1. A wake vortex avoidance system, comprising:
- a microphone array configured to detect low frequency sounds;
- a processor configured to determine a geometric mean coherence function based on the detected low frequency sounds; and
- a display configured to identify wake vortices based on the determined geometric mean coherence.

2. The system of claim 1, where the low frequency sounds are detected during at least one of aircraft takeoff and aircraft landing.

3. The system of claim 1, where a microphone of the microphone array is disposed in a windscreen assembly.

4. The system of claim 3, where the microphone consumes less than about 50 mW.

5. The system of claim 3, where the windscreen assembly is impervious to water for all-weather operation.

6. The system of claim 3, where the windscreen assembly is mounted flush to a ground surface.

7. The system of claim 3, further including drainage around the windscreen assembly.

8. The system of claim 1, further including an acoustic source configured to monitor a health of the microphone.

9. The system of claim 1, where the microphone array detects a pressure burst and the processor notes a time of the pressure burst.

10. The system of claim 9, where the wake vortices are associated with the time of the pressure burst.

11. The system of claim 1, where the display is configured to identify the geometric mean coherence function versus time to reveal sufficient vortex decay to resume airport operations on a runway.

12. The system of claim 1, where a minimum distance between microphones of the microphone array is about 30 feet.

13. A method, comprising:

detecting low frequency sounds with an array of microphones;

determining, with a processor, a geometric mean coherence function based on the detected low frequency sounds; and identifying wake vortices based on the determined geometric mean coherence function.

14. The method of claim 13, further comprising:

converting the low frequency sound to a digital signal and determining a time history of the digital signal.

15. The method of claim 14, further comprising performing a Fast Fourier Transform operation to yield a power spectral density function of the digital signal.

16. The method of claim 15, further comprising determining a cross power spectral density function for pairs of microphones of the array of microphones.

17. The method of claim 16, further comprising:

determining a coherence for the pairs of microphones; and determining the geometric mean coherence from the coherence for the pairs of microphones.

18. A wake vortex avoidance system, comprising:

a detection station configured to detect low frequency sounds; and a data acquisition station configured to determine a geometric mean coherence function based on the detected low frequency sounds, the geometric mean coherence function used to identify wake vortices.

19. The system of claim 18, where the detection station comprises:

a microphone configured to consume less than about 50 mW;

a windscreen assembly impervious to water for all-weather operation, where the windscreen assembly is mounted flush to a ground surface;

a drainage around the windscreen assembly; and an acoustic source configured to monitor a health of the microphone.

20. The system of claim 18, where the detection station is configured to detect a pressure burst and the data acquisition station is configured to note a time of the pressure burst, where the wake vortices are associated with the time of the pressure burst and the geometric mean coherence function is determined versus time to reveal sufficient vortex decay to resume airport operations on a runway.

* * * * *